(12) United States Patent
Sievers-Tostes et al.

(10) Patent No.: US 8,484,334 B2
(45) Date of Patent: Jul. 9, 2013

(54) ALLOCATING RESOURCES BASED ON RULES AND EVENTS

(75) Inventors: Henrique Sievers-Tostes, Duesseldorf (DE); Jens Staeck, Sandhausen (DE)

(73) Assignee: SAP Aktiengesellschaft, Walldorf (DE)

( * ) Notice: Subject to any disclaimer, the term of this patent is extended or adjusted under 35 U.S.C. 154(b) by 622 days.

(21) Appl. No.: 11/095,054

(22) Filed: Mar. 31, 2005

(65) Prior Publication Data

US 2006/0224740 A1 Oct. 5, 2006

(51) Int. Cl.
*G06F 15/173* (2006.01)

(52) U.S. Cl.
USPC .......................................... 709/224; 709/223

(58) Field of Classification Search
USPC .......... 718/102–105; 709/220–221, 223–224, 709/226
See application file for complete search history.

(56) References Cited

U.S. PATENT DOCUMENTS

| | | | | |
|---|---|---|---|---|
| 6,745,221 | B1 * | 6/2004 | Ronca ............................. | 718/104 |
| 7,185,156 | B2 * | 2/2007 | Fujibayashi et al. .......... | 711/161 |
| 7,506,307 | B2 * | 3/2009 | McCollum et al. ............ | 717/117 |
| 2003/0236745 | A1 * | 12/2003 | Hartsell et al. .................. | 705/40 |
| 2004/0267897 | A1 * | 12/2004 | Hill et al. ....................... | 709/217 |

FOREIGN PATENT DOCUMENTS

| | | |
|---|---|---|
| EP | 1 708 088 | 10/2006 |
| GB | 2353915 | 3/2001 |
| WO | WO 01/84301 | 11/2001 |

OTHER PUBLICATIONS

Sun Microsystems, "Solaris 9 Resource Manager Software: A Technical White Paper," pp. P1-P33, 2002, XP-002294650.
File History of EPO Application No. 05 007 070.5, which includes the documents listed below (downloaded Nov. 28, 2012).
Filing of the application as premier depot (Mar. 31, 2005).
Issuing European Search Report (Aug. 19, 2005).
First communication raising issues under Art. 84, 54(1) and (2) and 56 EPC (Apr. 17, 2007).
Receiving reply with new claims 1-18 (Jun. 21, 2007).
Second communication raising issues under Art. 84 and 56 EPC (Oct. 27, 2008).
Receiving reply with new claims 1-18 (Mar. 4, 2009).
Summons to attend Oral Proceedings (Dec. 28, 2010).
Receiving reply with new claims 1-18 and informing that neither the applicant nor a representative will attend the Oral Proceedings (Aug. 2, 2011).
Telephone conversation informing the applicant about the preliminary opinion of the examining division concerning new claim 1 (Mar. 2, 2011).
Oral Proceedings in absence of the applicant and refusal of the application under Art. 97(2) (Mar. 17, 2011).
Decision to Refuse in EP Patent Application No. 05007070.5, dated Mar. 29, 2011.

* cited by examiner

*Primary Examiner* — Benjamin R Bruckart
*Assistant Examiner* — Shripal Khajuria
(74) *Attorney, Agent, or Firm* — Fish & Richardson P.C.

(57) ABSTRACT

A method of providing an application with a resource of a computer system includes storing a set of rules for assigning resources of the computer system, identifying an event, and assigning the resource to the application based on the event and at least rule in the set of rules. The method may also include receiving an event message that corresponds to the event, where the event is identified from the event message.

13 Claims, 5 Drawing Sheets

ALLOCATING RESOURCES BASED ON RULES AND EVENTS

TECHNICAL FIELD

The patent application relates to allocating system resources to applications running in a computer system based on rules and events.

BACKGROUND

In computer-driven processes, such as billing and accounting, individual functions can be performed by computer applications (or simply, "applications"). Examples of functions that can be performed by applications include, but are not limited to, monitoring status of an item, booking items for shipment, monitoring stocks of items, printing status reports, obtaining orders for items, coordinating shipment of items, receiving orders, operating machinery, controlling logistics, and controlling storage systems.

By way of example, production lines typically run according to pre-defined plans, which are controlled by applications. During production line operation, supervisors may detect disturbances, evaluate which applications are needed for production, and assign such applications a higher priority. However, an application can become a bottleneck. That is, an increased workload that may be required from the application can cause the application to stall, or at least cause the process to run slower than usual. The supervisor can assign more system resources to the application manually, thereby enabling the application to run faster and, as a result, to reduce processing backlogs.

Since system resources are limited, the supervisor has to decide which application(s) must do without their current amount of resources (i.e., which application(s) should have to sacrifice at the expense of a high-priority application). This can cause problems in a production process, since the supervisor needs the authority to allocate resources, and also needs in-depth knowledge of all applications that are running.

Examples of system resources that can be allocated and re-allocated include, but are not limited to, central processing unit (CPU) time, storage, and access to data sources such as CD-ROM and DVD drives, printers, scanners, and other peripherals. Resources that are required for different applications can vary. However, applications that are scheduled to run concurrently can also require the same system resources. Thus, when one such application has priority access to a system resource, other such applications may have to wait until system resources are available before running.

If an unpredicted event occurs, a supervisor may have to assign system resources to critical (high-priority) applications and to reduce access to system resources for non-critical applications manually. Since applications can be run on different production sites, different supervisors may need to contact each other, and to agree on a strategy to react to the event. This can be extremely time consuming and error prone. Additionally, responsibilities and access authorities for certain applications need to be checked.

SUMMARY

The present invention provides methods and apparatus, including computer program products, for allocating system resources to applications running within a computer system based on rules and events. Aspects of the invention are set forth below.

In general, in one aspect, the invention features a method of providing an application with a resource of a computer system. The method includes storing a set of rules for assigning resources of the computer system, identifying an event, and assigning the resource to the application based on the event and a rule in the set of rules. This aspect includes numerous advantages, such as reducing the amount of manual interaction required to assign computer resources, increased efficiency resulting from automation, and reduced reaction time to events, resulting in increases in business process speed. This aspect of the invention may include one of more of the following features.

The set of rules may be defined using a rules engine. The method may include receiving an event message that corresponds to the event.

The event may be identified from the event message. A rule may be an instruction to assign the resource to the application in response to the event. Assigning may include re-allocating the resource to the application from another application.

At least one rule in the set of rules may assign priorities to applications based on events. The priorities may specify applications to receive resources. At least one rule in the set of rules may define a utilization ratio according to which resources are assigned proportionately to the application and to at least one other application. Assigning may be performed by a resource allocator based on a rule provided by the rules engine.

The method may include monitoring events in a process, where the identified event is a monitored event. The process may be, e.g., one of a production process, a delivery process, a data management process, a human resource management process, a user helpdesk process, a monitoring process of a production plant, and a telecommunications process. The event may include a level of activity associated with the process. The method may also include generating an event message in response to identifying the event. Assigning may include identifying the event based on the event message.

In general, in another aspect, the invention features a system for providing an application with computer resources. The system includes a rules engine to store a set of rules for use in assigning the computer resources, to receive event messages corresponding to events, and to match rules to events. A resource allocator provides the application with a computer resource based on a rule and an event matched by the rules engine.

In other aspects, the invention features apparatus and computer program products that correspond to the methods set forth above.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals denote like elements in the figures.

DETAILED DESCRIPTION

Figure 2:
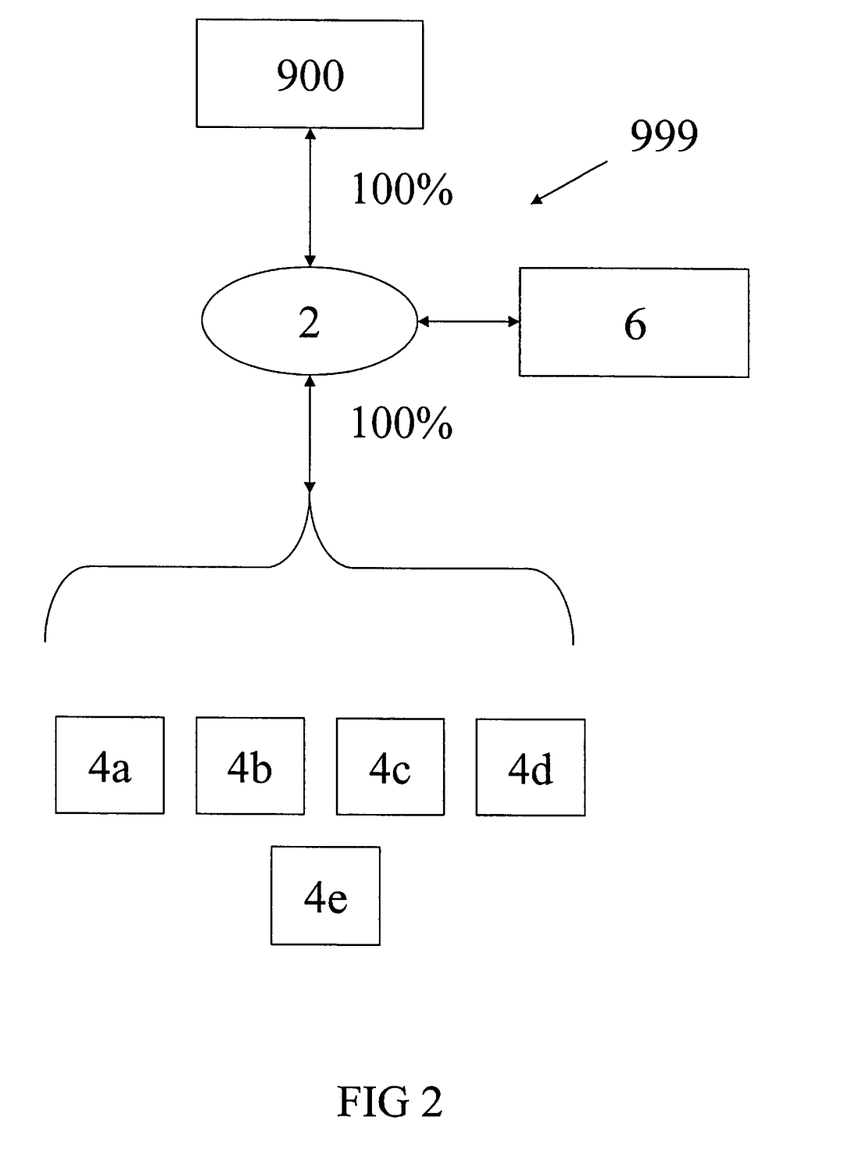
FIG. 2 depicts a resource allocator, a computer system, and a rules engine operating without respect to the rules described herein.

FIG. 2 illustrates a computer system 999, which includes computer 900 and software, which is labeled 2, 4, 6. Computer 900 includes hardware and operating software, such as an operating system, device drivers, and the like. Included in the software are various applications 4a to 4e (referred to collectively as applications 4), which may be executed on computer 900. Access of applications 4 to resources of computer 900 is monitored and controlled by a resource allocator 2. A rules engine 6 communicates with resource allocator 2. Rules engine 6 instructs resource allocator 2 to control access of applications 4 to resources of computer 900. Although not depicted as such, computer 900 can be a distributed system with a plurality of computers operating as a single system.

Applications 4 may be any type of computer-based application. For example, applications 4 can be an enterprise resource planning system 4a; an end user terminal 4b; a background system 4c (e.g., for printing lists, selecting data from a table, archiving, etc.); a personal computer (PC) application 4d; or an administrative application 4e. Any other applications may also be included within applications 4, examples of which include, but are not limited to a production process and other production-related processes.

During normal operation, each application 4 has unlimited access to system resources of computer 900. That is, resource allocator 2 (described in more detail below) does not intervene when a particular application requests access to the system resources. In general, each application 4 can use all available (e.g., 100%) system resources absent the occurrence of some event. In general, competition between applications 4 requesting the same resource at the same time is not resolved by resource allocator 2.

Settings for resource allocator 2 can be based on the priority of each system. For example, such settings can be based on predetermined business priorities. For example, certain business processes can be assigned higher priorities than others. A monitor can be implemented to identify a list of "consumers", i.e., currently running data processes and applications, and to sort them by priority and payload.

Pre-defined rules can be stored in rules engine 6. Rules engine 6 permits defining different rules for various different operational states of processes and applications running in computer system 999. The rules can determine which system resources to assign to which applications 4 for particular events (defined below). The rules can also define which applications 4 are more important than others in case of particular events (i.e., the rules can prioritize the applications to specify which applications are given first, or other priority, access to particular system resources).

Each application 4 can have system resource requirements. Applications 4 can monitor their access to system resources. In cases where such requirements are not met, an application 4 may require priority access to a system resource. For example, processes running in an application can be backlogged, requiring supporting applications to operate at a faster speed. This can require assigning the application more system resources.

Figure 5:
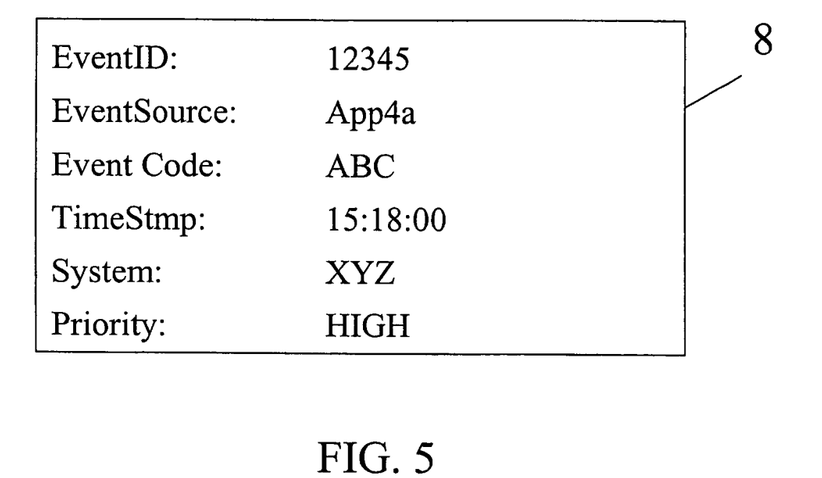
FIG. 5 shows an event message.

Every application state can be an event, as that term is used herein. For example, events may include, but are not limited to, a back-log, a deficiency in access to system resource, a down time in a certain process or application. Other occurrences not listed here also may be events. Events can be reported to rules engine 6 using event messages. An example of an event message 8 is illustrated in FIG. 5.

Event message 8 can include information regarding a corresponding event. For example, event message 8 can have an "eventID" (i.e., an event identifier). Event 8 has an eventID of 12345. To identify an application or process that caused the event, event message 8 can store information regarding an event's source. In event message 8, this is "APP4a", which identifies application 4a as the source of the event.

To enable rules engine 6 to determine which rule to apply, event message 8 can include an event code. The event code, in this case "ABC", supports identification of a type of the event by rules engine 6. In addition, an event message can include a timestamp and a system identifier. The time stamp identifies the time that the event occurred. The system identifier identifies the system in which the event occurred. For example, in a distributed environment, it might be helpful to determine the particular computer system on which the event occurred. In addition, event message 8 can include a priority indicator. The priority indicator enables classification of the event into different priorities, which thereby enables rules engine 6 to handle incoming events differently.

Event messages can be generated in any number of ways. For example, event messages 8 can be generated on a case-by-case basis by applications 4 An application can generate an event message 8 advising that an application requires more system resources. Event messages 8 can be generated by applications other than an application requiring more system resource. Event messages 8 can be generated by persons monitoring a production process. Event messages can be generated by machines, sensors, production lines, and any other entities involved in a process—production or otherwise. Event messages can be generated by a monitoring engine, which monitors all relevant processes and applications with regard to workload, processing speed, importance, etc. Each generated event messages can be provided to rules engine 6. The event messages may be provided by the application that generated them, or by a supporting routine.

Different events can require different measures to be taken in order to solve a problem corresponding to the event. Rules in rules engine 6 specify how to react to an event. As a result, it is possible to create emergency plans for applications 4 in case of different events. These emergency plans may support automatic reaction to certain events, thereby resolving problems within a relatively short time. What is meant by "automatic" here is that the reaction can occur without significant human intervention.

Figure 3:
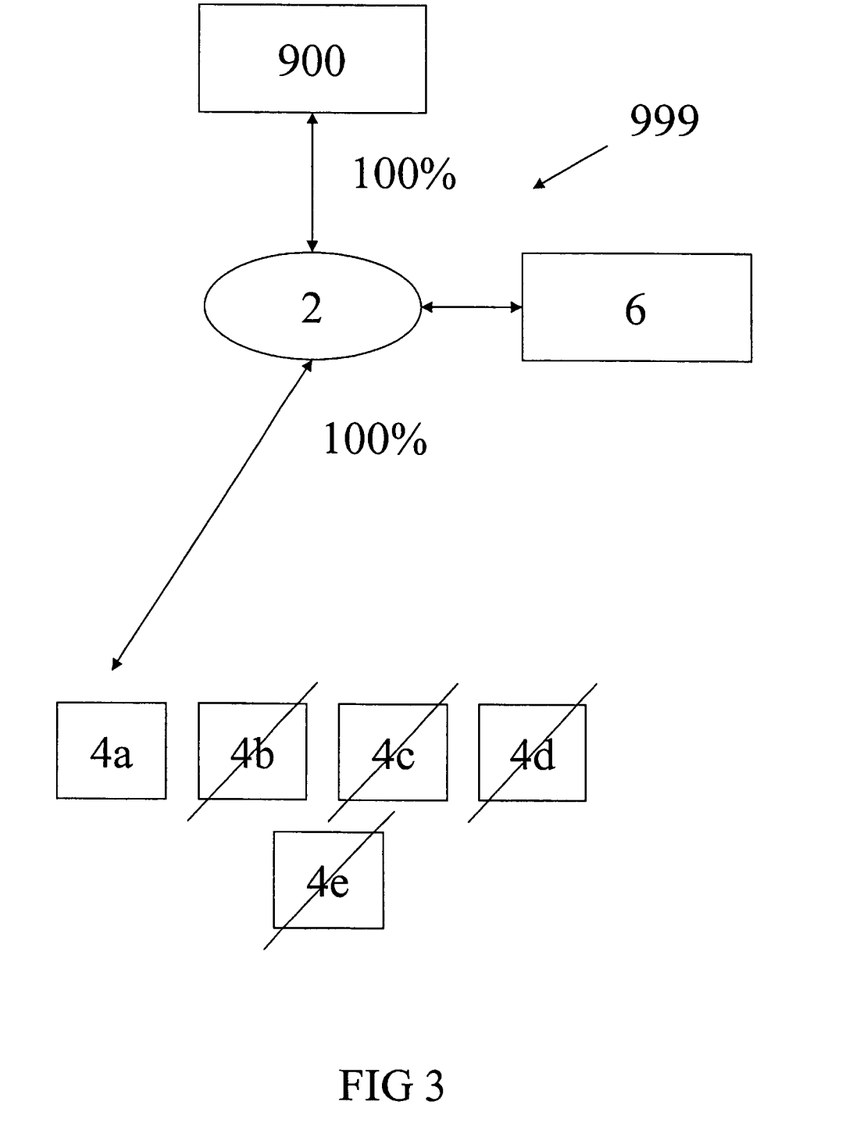
FIG. 3 depicts a resource allocator, a computer system, and a rules engine operating within constraints of the rules described herein.

The rules may define system resources assigned to an application 4 so that, e.g., a required processing speed of the application 4 can be achieved. The rules may also, or alternatively, define reductions in system resources for an application 4 in favor of another application 4 (e.g., based on the priorities of the two applications). Depending on the event, certain applications may need to be processed with an increased processing speed or processing rate to reduce a backlog. These applications may require more system resources than others. Other applications, which are not system critical, can have reduced access to system resources. This information is defined in the rules, as noted FIG. 3 shows the system of FIG. 2 in a case where an event is reported to rules engine 6. As previously noted, rules engine 6 receives and processes monitored events. The monitored events may be defined by event messages provided to rules engine 6 from a monitoring engine (in resource allocator 2 or elsewhere). Monitored events can be processed within rules engine 6. Rules engine 6 can determine an applicable rule for a monitored event and can trigger assignment of system resources to an appropriate application(s) 4 to resolve problems resulting from, and/or caused by, the monitored event.

Figure 6:
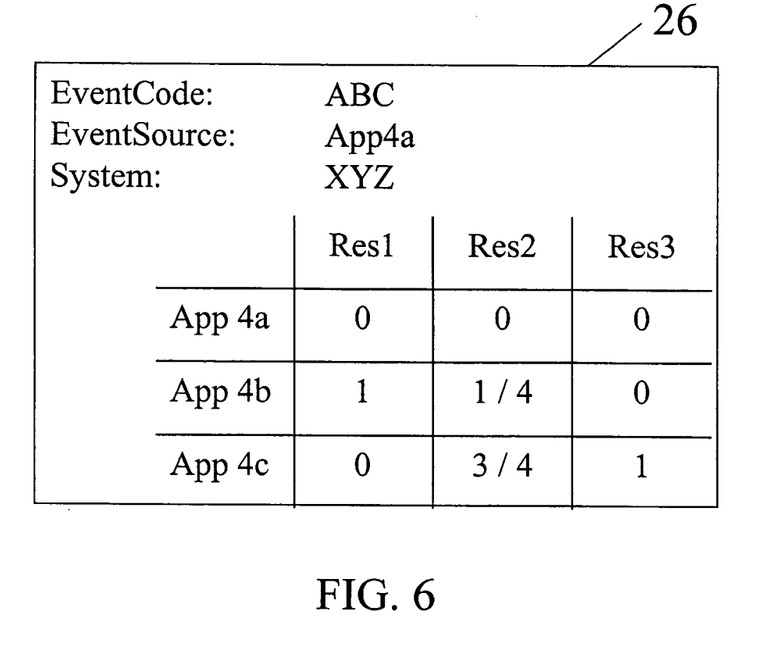
FIG. 6 shows a table stored in the rules engine.

Rules engine 6 stores rules 24, as shown in FIG. 6. Rules 24 can include a rule code. Rules 24 can also include an event code, an event source, and a system identifier. The event code, the event source and the system identifier enable selecting an applicable rule upon receipt of a event message 8. Rules engine 6 can compare the event code, the event source, and the system identifier of a received event message with information contained in the rules and, based on this comparison, rules engine 6 can select an appropriate rule for the event defined by the event message.

Rules engine 26 may include a table indicating applications 4 affected, and system resources affected, by a particular event. Each cell in the table can indicate a ratio of access of a corresponding application to a corresponding system resource. In the case shown in FIG. 6, application 4b has full access to resource 1 (Res1), and all other applications have no access. Access to resource 2 (Res2) is divided by a ratio of 0/1/3 between applications 4a, 4b, 4c. Access to resource 3 (Res3) is only granted to application 4c.

By way of example, a disturbance (i.e., an event) may cause application 4a to have a backlog of waiting tasks. Rules engine 6 provides that, in such an event, resource allocator 2 allocates all available system resources of computer 900 to application 4a, and postpones processing of all other applications 4b to 4e. Resource allocator 2 can provide application 4a direct access to the system resources of computer system 900. In this example, resource allocator 2 puts requests by other applications 4b to 4e on hold for the time being.

Priorities can also be assigned to applications based on events using the rules described herein. For example, the resources required for a certain application 4 to obtain a certain processing rate may not be known beforehand. However, applications 4, which may be critical in case of a certain event, may be known. These critical applications 4 should have priority access to system resources because they should have the highest possible processing rate. Some implementations allow determining a priority for a process in accordance with a event. For example, an event can cause different processes to stall. In order to resolve the problem, some processes may be designated as more important than others. Thus, the more important processes can have a higher priority.

The rules may define a system resource utilization ratio between applications 4, which is based on events. This utilization ratio can define the access ratio to system resources between different applications 4. For example, two critical applications 4, which are executing at the same time, can be assigned access to CPU time with a ratio of 1 to 3 (e.g., one application can have "X" amount of CPU time and the other application can have "3×" amount of CPU time). The CPU time is shared between the two applications 4, at the specified ratio and for a specified time, e.g., until a particular problem corresponding to an event is solved. The end of the problem can be determined by, e.g., an End-Event message, which may be generated by an application, or by a polling mechanism.

An example of the foregoing is as follows. A production line may have a terminal downtime. As such, a shop-floor supervisor may not able to book finished products for five hours. Booking can result in creating a data set for the particular term or changing a status of a corresponding data set from, e.g., production to ready for shipment. Application 4a may be on a terminal that is down. After a problem is solved, all goods may need to be booked by the application 4a in order to move them to shipment area, components used for manufacturing may need to be back-flushed from a central warehouse, and a reduction in line stock may need to occur in order to start automatic component replenishment.

In another example, there may be tasks that require more system capacity than normal. For example, if a company runs a business that is always operating, it may not be possible to halt operations for an adequate timeframe to address a problem. Consequently, repairs must occur while the business is running. Using the processes described herein, a supervisor can set a status of an application 4 to high priority. The priority can be set high by a rule in rules engine 6. Resource allocator 2 then can obtain system capacity and allocate resources to the requesting application 4a, while postponing background jobs and holding or canceling other applications.

The status of an event reported to rules engine 6 can be monitored by a polling process. Unless the event's status changes, which indicates the end of an event, rules engine 6 can continue to apply the rule that corresponds to the event. The end of an event can also be determined, for example, by an End-Event message, which is provided to rules engine 6 once a problem is solved or sufficiently alleviated.

Figure 4:
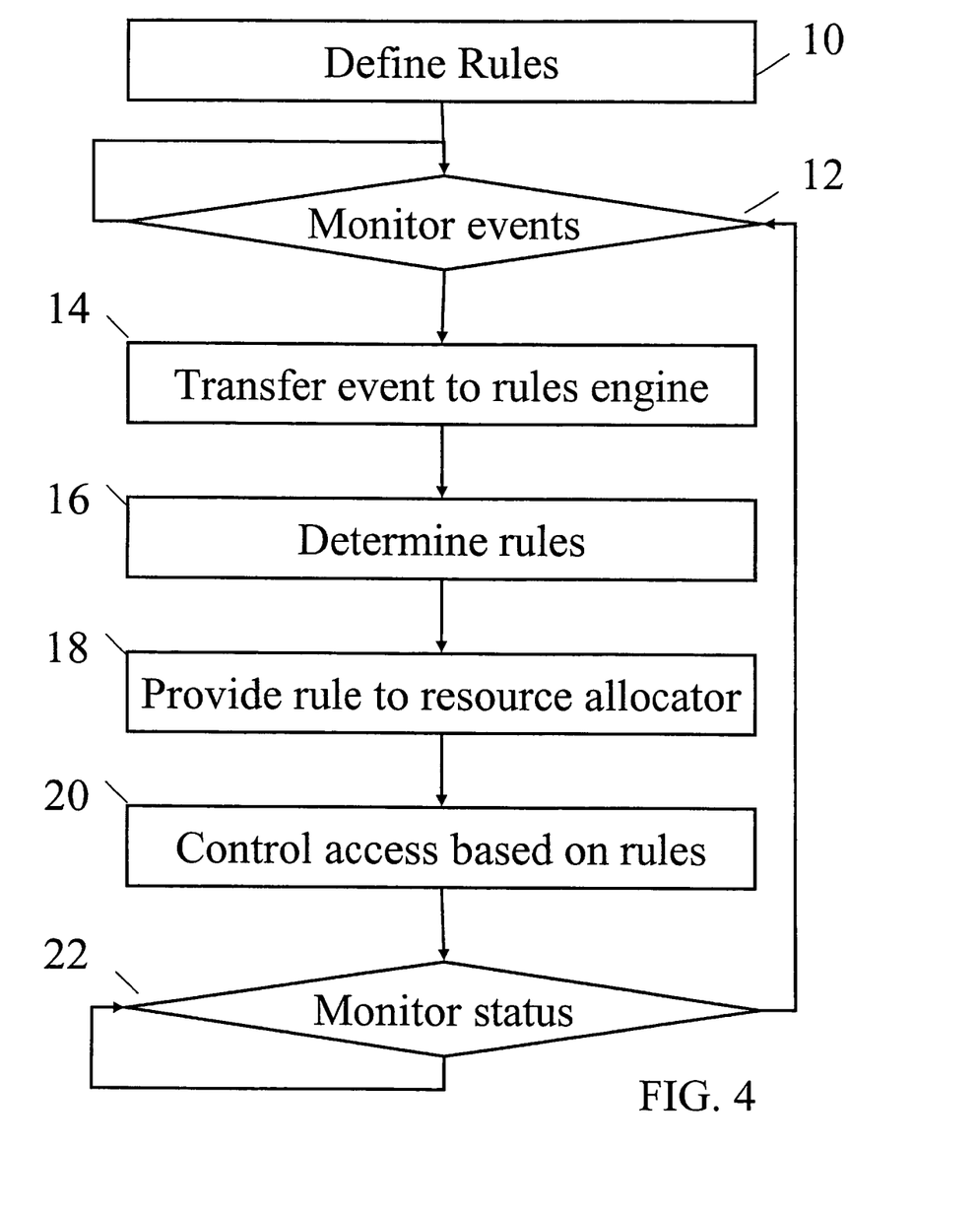
FIG. 4 a flowchart of a process for allocating system resources.

FIG. 4 is a flowchart of a process 5 for allocating computer system resources based on events. In a process 5, rules are defined (10) for various different events, as described above, and stored in rules engine 6. Process 5 monitors (12) events. For example, events may be monitored within a production process, a delivery process, a data management process, a human resource management process, a user helpdesk process, a monitoring process of a production plant, and/or a telecommunications process. Any types of events may be monitored by process 5, as noted above. Process 5 provides (14) event messages to the rules engine 6, identifies (16) an applicable rule based on the event message, and provides (18) the applicable rule (from rules engine 6) to resource allocator 2, which assigns system resources to application 4 based on the applicable rule.

In more detail, after the rules are defined (10), various applications are monitored (12). This can be done by any means, such as a monitoring engine or by the applications, sensors, humans, etc., as described above. A change in the state of an event, e.g., when a backlog is resolved, can also be detected and a new event message, e.g., an End-Event message, can be generated. These mechanisms facilitate determining when to end applying rules to solve a problem, e.g., when a problem is solved and the computer system can return to normal operation. Event messages 8 are transferred (14) to the rules engine 6. The rules engine 6 can determine (16) whether rules 26 are defined for certain events. For instance, based on a monitored workload, rules 26 define rules to assign or reduce system resources to and from an application. After an applicable rule has been identified (16) by rules engine 6, based on the received event message 8, the applicable rule is provided (18) by the rules engine 6 to the resource allocator 2.

Resource allocator 2 can monitor access of different applications 4 to different system resources. Resource allocator 2 can further control access (20) of applications 4 to system resources. Resource allocator 2 can be an access controller. Resource allocator 2 can receive, from rules engine 6, instructions according to which applications 4 should have access to which system resources. Resource allocator 2 assigns system resources dynamically, to applications 4, based on received rules. Dynamically can mean event driven, in this context. Depending on the different events and rules 26, resource allocator 2 can be responsible for providing application 4 with appropriate system resources.

The status of a process is monitored (22) to ensure that the allocation of system resources to a particular application resolves the problems, which resulted from monitored event. After all applications are back in a normal state, an End-Event message can be generated or the end state of the event can be detected by a permanent polling mechanism. The system can then again be monitored for new events 12.

Figure 1:
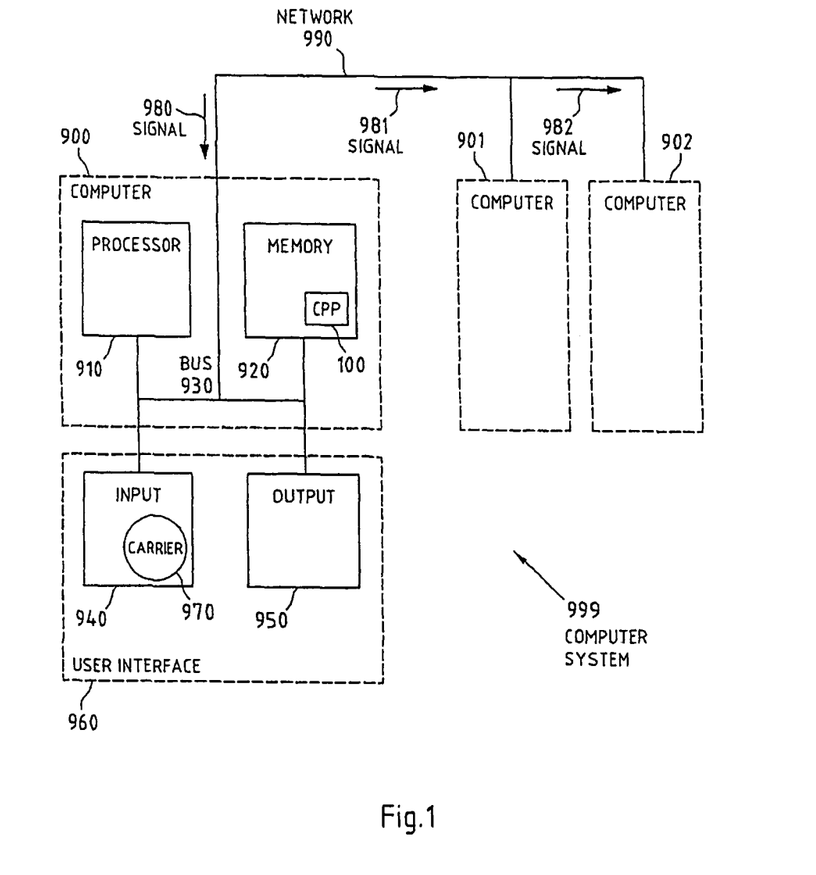
FIG. 1 depicts a computer system.

FIG. 1 illustrates a block diagram of an example of computer system 999 which, in this example, includes plural computers 900, 901, 902. It is noted, however, that the processes described above can be implemented on any type of processing device.

Computer 900 can communicate with computers 901 and 902 over network 990. Computer 900 has processor 910, memory 920, bus 930, and, optionally, input device 940 and output device 950 (I/O devices, user interface 960). The processes described above can be implemented by computer program product 100 (CPP), carrier 970 and/or signal 980.

With respect to computer 900, computer 901/902 is sometimes referred to as "remote computer", computer 901/902 may be, for example, a server, a peer device or other common network node, and typically has many or all of the elements described relative to computer 900. Computer 900 is may be a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer, or the like.

Processor 910 may be a CPU, a micro-controller unit (MCU), digital signal processor (DSP), or the like. Memory 920 includes elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by machine-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, and memory stick.

Memory 920 may be distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 includes program instructions and—optionally—data that cause processor 910 to execute method steps of the processes described herein. In other words, CPP 100 can control the operation of computer 900 and its interaction in network system 999 so that is operates to perform in accordance with the processes described herein. For example, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970. Carrier 970 is illustrated outside computer 900. For communicating CPP 100 to computer 900, carrier 970 is conveniently inserted into input device 940.

Carrier 970 may be implemented as any machine-readable medium, such as a medium largely explained above (memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

The processes described herein ("the processes") are not limited to use with the hardware and software described above; they may find applicability in any computing or processing environment and with any type of machine that is capable of running machine-readable instructions. All or part of the processes can be implemented in digital electronic circuitry, or in computer hardware, firmware, software, or in combinations thereof.

All or part of the processes can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the processes can be performed by one or more programmable processors executing one or more computer programs to perform the functions of the processes. The method steps can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements 20 of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with the processes can be rearranged and/or one or more such steps can be omitted to achieve the same, or similar, results to those described herein.

Elements of different embodiments described herein may be combined to form other embodiments not specifically set forth above. Other embodiments not specifically described herein are also within the scope of the following claims.

What is claimed is:

1. A method of providing an application with a resource of a computer system, the method comprising:
    storing a set of rules for assigning resources of the computer system;
    identifying an event based on an event message, the event message comprising a source identifier to identify a source of the event, an event code to identify a type of the event, a priority indicator that enables classification of the event into one of plural different priorities, and a system identifier to identify a location of the event, the event message being generated by the application;
    assigning the resource to the application dynamically based on the event message and at least one rule in the set of rules, the at least one rule assigning the resource to achieve a predefined processing speed for the application, the at least one rule assigning the resource based on priority of the application, the priority of the application being based on the event and based on the priority indicator of the event message;
    monitoring the event identified by the event message to ensure that assignment of the resource to the application resolves the event; and
    receiving an end-event message that corresponds to the event message, the end-event message indicating that the event has been resolved and that the assignment should cease, thereby returning the application to pre-event operation;
    wherein the set of rules are defined by data structures that correlate multiple applications to multiple resources for each event, wherein each data structure defines a percentage of each resource to be assigned to each correlated application for one event.

2. The method of claim 1, wherein the set of rules are defined using a rules engine.

3. The method of claim 1, wherein the at least one rule comprises an instruction to assign the resource to the application in response to the event.

4. The method of claim 1, wherein assigning comprises re-allocating the resource to the application from another application.

5. The method of claim 2, wherein assigning is performed by a resource allocator based on the at least one rule provided by the rules engine.

6. The method of claim 1, further comprising monitoring events in a process, the event comprising one of the events that are monitored.

7. The method of claim 6, wherein the process comprises one of a production process, a delivery process, a data management process, a human resource management process, a user helpdesk process, a monitoring process of a production plant, and a telecommunications process.

8. The method of claim 6, wherein the event comprises a level of activity associated with the process.

9. A computer program product stored on one or more non-transitory computer-readable storage media for providing an application with resources of a computer system, the computer program product comprising instructions that cause a machine to:
    store a set of rules for assigning resources of the computer system;
    identify an event based on an event message, the event message comprising a source identifier to identify a source of the event, an event code to identify a type of the event, a priority indicator that enables classification of the event into one of plural different priorities, and a system identifier to identify a location of the event, the event message being generated by the application;
    assign a resource to the application dynamically based on the event message and at least one rule in the set of rules, the at least one rule assigning the resource to achieve a predefined processing speed for the application, the at least one rule assigning the resource based on priority of the application, the priority of the application being based on the event and based on the priority indicator of the event message;
    monitor the event identified by the event message to ensure that assignment of the resource to the application resolves the event; and
    receive an end-event message that corresponds to the event message, the end-event message indicating that the event has been resolved and that the assignment should cease, thereby returning the application to pre-event operation;
    wherein the set of rules are defined by data structures that correlate multiple applications to multiple resources for each event, wherein each data structure defines a percentage of each resource to be assigned to each correlated application for one event.

10. The computer program product of claim 9, wherein the set of rules are defined using a rules engine.

11. The computer program product of claim 9, wherein the at least one rule comprises an instruction to assign the resource to the application in response to the event.

12. The computer program product of claim 9, wherein assigning comprises re-allocating the resource to the application from another application.

13. A system for providing an application with computer resources, the system comprising:
    a rules engine to store a set of rules for use in assigning computer resources, to interpret event messages that include information regarding corresponding events, and to match rules to events, an event message comprising a source identifier to identify a source of a corresponding event, an event code to identify a type of the corresponding event, a priority indicator that enables classification of the corresponding event into one of plural different priorities, and a system identifier to identify a location of the corresponding event, the corresponding event message being generated by the application; and
    a resource allocator to assign the application a computer resource dynamically based on a rule and an event matched by the rules engine, to monitor an event identified by the event message to ensure that assignment of the resource to the application resolves the event, the rule assigning the computer resource based on priority of the application, the priority of the application being based on the event and based on the priority indicator of the event message; and to receive an end-event message that corresponds to the event message, the end-event message indicating that the event has been resolved and that the assignment should cease, thereby returning the application to pre-event operation, the rule assigning the resource to achieve a predefined processing speed for the application;

wherein the set of rules are defined by data structures that correlate multiple applications to multiple computer resources for each event, wherein each data structure defines a percentage of each computer resource to be assigned to each correlated application for one event.

* * * * *